(12) United States Patent
Osborn et al.

(10) Patent No.: US 8,001,409 B2
(45) Date of Patent: Aug. 16, 2011

(54) SYNCHRONIZATION DEVICE AND METHODS THEREOF

(75) Inventors: Michael J. Osborn, Hollis, NH (US); Mark D. Hummel, Franklin, MA (US); Denis Rystsov, Arlington, MA (US)

(73) Assignee: GlobalFoundries Inc.

( * ) Notice: Subject to any disclaimer, the term of this patent is extended or adjusted under 35 U.S.C. 154(b) by 1111 days.

(21) Appl. No.: 11/750,443

(22) Filed: May 18, 2007

(65) Prior Publication Data

US 2008/0288805 A1    Nov. 20, 2008

(51) Int. Cl.
*G06F 1/12* (2006.01)
(52) U.S. Cl. .......................... 713/400; 345/558
(58) Field of Classification Search ................. 713/400; 345/558
See application file for complete search history.

(56) References Cited

U.S. PATENT DOCUMENTS

| | | | | |
|---|---|---|---|---|
| 4,419,746 A * | 12/1983 | Hunter et al. | ............ | 365/230.05 |
| 4,456,965 A * | 6/1984 | Graber et al. | ............ | 710/100 |
| 4,700,294 A * | 10/1987 | Haynes | ............ | 341/106 |
| 5,778,000 A * | 7/1998 | Dosiere et al. | ............ | 370/512 |
| 5,799,175 A * | 8/1998 | Cassiday et al. | ............ | 713/400 |
| 5,809,031 A * | 9/1998 | Horikawa et al. | ............ | 370/506 |
| 5,822,516 A * | 10/1998 | Krech, Jr. | ............ | 714/42 |
| 5,915,107 A * | 6/1999 | Maley et al. | ............ | 713/400 |
| 5,978,935 A * | 11/1999 | Kim et al. | ............ | 714/42 |
| 6,006,340 A * | 12/1999 | O'Connell | ............ | 713/600 |
| 6,033,441 A * | 3/2000 | Herbert | ............ | 713/375 |
| 6,049,887 A * | 4/2000 | Khandekar et al. | ............ | 713/503 |
| 6,055,285 A * | 4/2000 | Alston | ............ | 375/372 |
| 6,128,749 A * | 10/2000 | McDonnell et al. | ............ | 713/600 |
| 6,212,122 B1 * | 4/2001 | Wen | ............ | 365/230.05 |
| 6,263,410 B1 * | 7/2001 | Kao et al. | ............ | 711/156 |
| 6,366,530 B1 * | 4/2002 | Sluiter et al. | ............ | 365/240 |
| 6,366,991 B1 * | 4/2002 | Manning | ............ | 711/167 |
| 6,392,494 B2 * | 5/2002 | Takeyabu et al. | ............ | 331/11 |
| 6,396,887 B1 * | 5/2002 | Ware et al. | ............ | 375/354 |
| 6,418,518 B1 * | 7/2002 | Wen | ............ | 711/154 |
| 6,515,962 B1 * | 2/2003 | Sawey et al. | ............ | 370/228 |
| 6,516,362 B1 * | 2/2003 | Magro et al. | ............ | 710/58 |
| 6,529,988 B1 * | 3/2003 | Yoshikawa et al. | ............ | 710/305 |
| 6,598,132 B2 * | 7/2003 | Tran et al. | ............ | 711/154 |
| 6,678,756 B1 * | 1/2004 | Tseng et al. | ............ | 710/52 |
| 6,834,093 B1 * | 12/2004 | Chiu | ............ | 377/39 |
| 6,915,399 B1 * | 7/2005 | McDonnell et al. | ............ | 711/167 |
| 6,937,617 B2 * | 8/2005 | Rakib et al. | ............ | 370/485 |
| 7,076,646 B2 * | 7/2006 | Chang | ............ | 713/1 |
| 7,127,536 B2 * | 10/2006 | Taylor et al. | ............ | 710/58 |
| 7,161,999 B2 * | 1/2007 | Parikh | ............ | 375/354 |
| 7,203,127 B1 * | 4/2007 | Tamlyn et al. | ............ | 365/233.11 |
| 7,424,623 B2 * | 9/2008 | Du et al. | ............ | 713/300 |
| 7,454,324 B1 * | 11/2008 | Seawright et al. | ............ | 703/14 |
| 7,454,645 B2 * | 11/2008 | Li et al. | ............ | 713/500 |
| 7,574,635 B1 * | 8/2009 | Alfke | ............ | 714/719 |

(Continued)

*Primary Examiner* — Ji H Bae
*Assistant Examiner* — Zahid Choudhury

(57) ABSTRACT

A device includes different clock domains. Each clock domain is synchronized to a different clock signal, and the data transfer between clock domains occurs through a FIFO memory. It is determined which clock domain has a slower clock frequency, and the clock domain associated with the slower clock is selected to generate pointers used to access the FIFO memory in both clock domains. Therefore, the pointers are used to read and write data at the FIFO memory resulting in a transfer of the data between the clock domains. Because the pointers used for data transfer are generated and provided by the clock domain associated with the slower clock, the latency resulting from transferring the pointer between the clock domains is reduced.

20 Claims, 5 Drawing Sheets

U.S. PATENT DOCUMENTS

| | | | |
|---|---|---|---|
| 2001/0045868 A1* | 11/2001 | Takeyabu et al. | 331/2 |
| 2002/0070761 A1* | 6/2002 | Abbiate et al. | 327/48 |
| 2002/0196886 A1* | 12/2002 | Adkisson | 375/362 |
| 2002/0199124 A1* | 12/2002 | Adkisson | 713/400 |
| 2004/0128627 A1* | 7/2004 | Zayas | 716/1 |
| 2004/0193936 A1* | 9/2004 | Kelly | 713/500 |
| 2004/0255188 A1* | 12/2004 | Lo | 714/12 |
| 2006/0150220 A1* | 7/2006 | Martin | 725/81 |
| 2006/0206700 A1* | 9/2006 | Umedu | 713/1 |
| 2007/0002991 A1* | 1/2007 | Thompson et al. | 375/372 |
| 2007/0005952 A1* | 1/2007 | Ho | 713/2 |
| 2007/0011368 A1* | 1/2007 | Wang et al. | 710/52 |
| 2007/0061090 A1* | 3/2007 | Luo et al. | 702/64 |
| 2007/0186124 A1* | 8/2007 | Streibl et al. | 713/400 |
| 2007/0233411 A1* | 10/2007 | Suto et al. | 702/89 |
| 2008/0172540 A1* | 7/2008 | Lemke et al. | 711/167 |
| 2009/0119531 A1* | 5/2009 | Wang et al. | 713/400 |

* cited by examiner

US 8,001,409 B2

SYNCHRONIZATION DEVICE AND METHODS THEREOF

FIELD OF THE DISCLOSURE

The present disclosure relates to transfer of information in a data processing device and more particularly to the transfer of information between different clock domains.

BACKGROUND

Data processing devices sometimes employ modules that are in different clock domains, with each domain synchronized to a clock that is asynchronous with the clocks of other clock domains. When data is transferred between clock domains, the data processing device employs a synchronization technique to ensure that the data is transferred properly. One method of transferring data between devices having different clock domains uses a First In First Out (FIFO) memory. Data to be transferred is written to the FIFO memory by a device in one clock domain (the source clock domain) and read from the FIFO by a device in the other clock domain (the target clock domain). One of the clock domains provides a pointer to the other clock domain indicating the FIFO memory location where the data has been written. The target clock domain does not read from the FIFO memory location until the pointer has been generated at one clock domain and provided to the other clock domain through a metastability synchronizer that allows the pointer to be reliably passed between the clock domains, ensuring that the data has been properly stored in the FIFO memory location before it is read. However, if the clock domain that receives the pointer is slower than the clock domain that generated the pointer, the amount of time required to reliably provide the pointer via the synchronizer is increased. This increased latency can cause an undesirable delay in communication of data between the clock domains, or require an undesirable increase in the size of the FIFO memory to accommodate data to be transferred. Accordingly, there is a need for an improved technique for transferring data between clock domains.

BRIEF DESCRIPTION OF THE DRAWINGS

The present disclosure may be better understood, and its numerous features and advantages made apparent to those skilled in the art by referencing the accompanying drawings.

DESCRIPTION OF THE DRAWINGS

A device and method of data transfer is disclosed herein to facilitate data transfers between different clock domains. Each clock domain is synchronized to a different clock signal, and the data transfer between clock domains occurs through a FIFO memory. It is determined which clock domain has a slower clock frequency, and the clock domain associated with the slower clock is selected to generate pointers used to access the FIFO memory in both clock domains. Therefore, the pointers are used to read and write data at the FIFO memory resulting in a transfer of the data between the clock domains. Because the pointers used for data transfer are generated and provided by the clock domain associated with the slower clock, the latency resulting from transferring the pointer between the clock domains is reduced.

Figure 1:
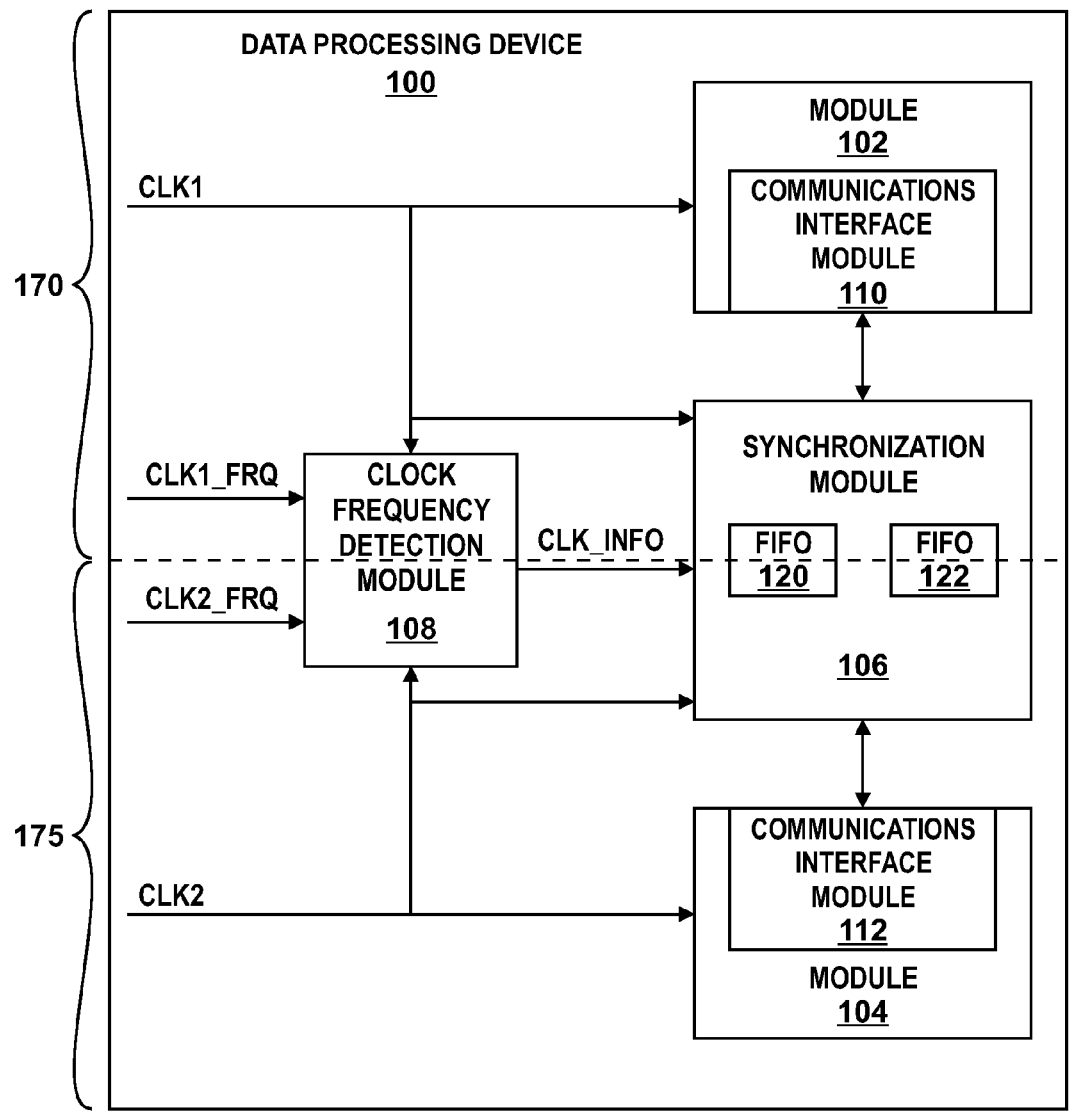
FIG. 1 is a block diagram of a particular embodiment of a data processing device having two clock domains.

Referring to FIG. 1, a block diagram of a particular embodiment of a device including a data processing device 100 is illustrated. The data processing device 100 can be a microprocessor, microcontroller, ASIC (application specific integrated circuit), and the like. The data processing device 100 includes a module 102, a module 104, a synchronization module 106, and a clock frequency detection module 108. The module 102 includes an input to receive a clock signal labeled CLK1 and a bi-directional connection to the synchronization module 106. The module 104 includes an input to receive a clock signal labeled CLK2 and a bi-directional connection to the synchronization module 106. The synchronization module 106 includes an input to receive a signal labeled CLK_INFO, an input to receive the signal CLK1, and an input to receive the clock signal CLK2. The clock frequency detection module 108 includes an input to receive the clock signal CLK1, an input to receive the clock signal CLK2, an input to receive a signal CLK1_FRQ, an input to receive a signal CLK2_FRQ, and an output to provide the signal CLK_INFO. The clock signals CLK1 and CLK2 may be generated at the data processing device 100, or externally.

The clock frequency detection module 108 is configured to determine which of the clock signals CLK1 and the clock signal CLK2 has a higher frequency. In a particular embodiment, the clock frequency module 108 can count cycles of each clock signal to determine the frequency of each clock signal to determine which has the higher frequency. In another embodiment, the signals CLK1_FRQ and CLK2_FRQ provide information to the clock frequency detection module 108 indicating the clock signal with the higher frequency. The clock frequency detection module 108 is further configured to provide information via the signal CLK_INFO indicating which of the clock signals has a higher frequency.

The module 102 can be any functional module of the data processing device 100, such as a processor core, memory controller, switching fabric, input/output controller, and the like. The module 102 includes a communication interface module 110 that is configured to communicate with other modules of the data processing device 100 in order to send data to and receive data from those modules.

The module 104 can be any functional module of the data processing device 100, such as a processor core, memory controller, switching fabric, input/output controller, and the like. The module 104 includes a communication interface module 112 that is configured to communicate with the modules of the data processing device 100 in order to send data to and receive data from those modules.

Both the module 102 and the module 104 are synchronous logic modules. As used herein, the term synchronous logic module refers to a module that includes one or more logic elements, such as latches or flip-flops, which are synchronized to a specific clock signal.

As illustrated in FIG. 1, the data processing device 100 includes a time domain 170 associated with the clock signal CLK1 and a time domain 175 associated with the clock signal CLK2. As used herein, the term clock domain refers to those logic portions of a device that are synchronized to a common clock signal. Therefore, the logic elements of the module 102 are synchronized with the clock signal CLK1, while the logic elements of the module 104 are synchronized with the clock signal CLK2. Although the clock frequency detection module 108 is illustrated as being in both time domains 170 and 175, it will be appreciated that in other embodiments it could be located exclusively in either time domain.

The synchronization module 106 is configured to use a FIFO memory 120 and a FIFO memory 122 to transfer data between clock domains 170 and 175 of the data processing device 100. To transfer the data, the synchronization module 106 is configured to operate in both the clock domain 170 and the clock domain 175. Therefore, the synchronization module 106 is configured so that some of its logic elements are clocked by the clock signal CLK1 and some of its logic elements are clocked by the clock signal CLK2.

During operation, the synchronization module 106 stores data from the module 102 to be provided to the module 104 and data from the module 104 to be provided to the module 102. To transfer data, the synchronization module 106 generates a pointer indicating the location of the FIFO memory 120 or the FIFO memory 122 where the data being received is to be stored and from where the data being provided is to be read.

In order to ensure that the data is transferred properly, the synchronization module 106 transfers the generated pointer between the clock domains. That is, the synchronization module 106 can use logic elements to synchronize a pointer to the other clock domain. Once the pointer has been transferred across time domains, the synchronization module 106 can read or store to or from the pointer location. Because the pointer is used in both clock domains for the data transfer, the synchronization module 106 does not complete a data transfer from a specific FIFO location without the pointer being provided to both clock domains. This ensures that data to be transferred has been properly stored at the FIFO memory 120 or the FIFO memory 122 in one clock domain before it is read in the other clock domain.

The pointer can be provided from either the target clock domain or the source clock domain. The synchronization module 106 ensures that the pointer is provided from the clock domain associated with the clock with the lower frequency, based on the information provided by the CLK_INFO signal. By ensuring that the pointer is transferred from the lower frequency clock domain to the higher frequency clock domain, the latency due to the pointer transfer is reduced. This improves the efficiency of the synchronization module 106 in transferring data.

In addition, the relative frequency of the clock signals CLK1 and CLK2 may change over time. For example, the clock domain associated with the clock signal CLK1 may be placed into a low-power mode, altering the frequency of CLK1. The synchronization module 106 ensures that the pointer is provided from the clock domain associated with the clock with the lower frequency, based on the information provided by the CLK_INFO signal, even after a change in the relative frequencies of the clocks. Accordingly, the efficiency of the synchronization module 106 is maintained after a change in clock frequencies. In a particular embodiment, the synchronization module temporarily suspends the reading and writing of data from the FIFO memories 120 and 122 in response to a change in clock frequencies, to ensure that the change does not result in a loss of data.

Figure 2:
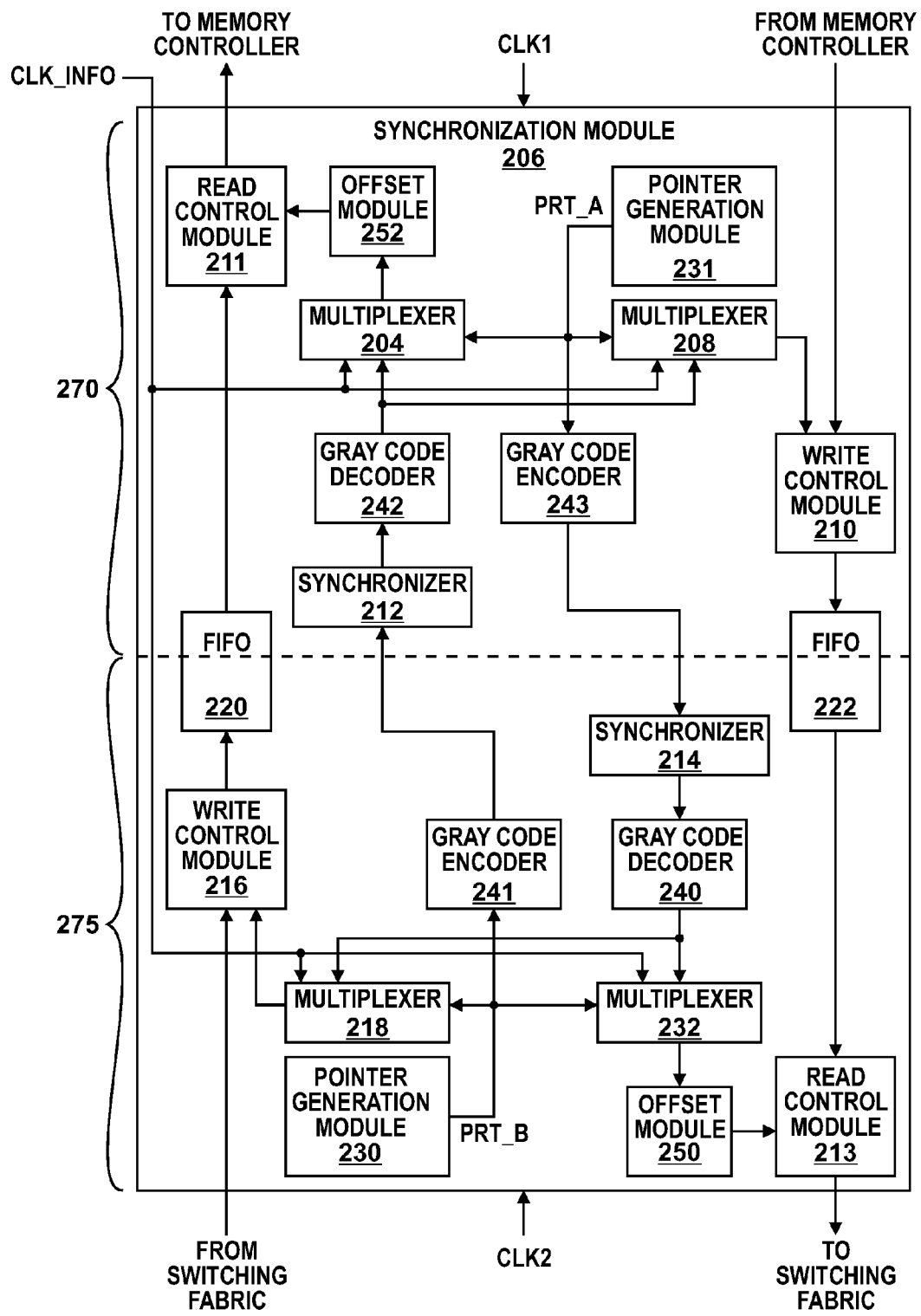
FIG. 2 is a block diagram of a particular embodiment of a synchronization module of FIG. 1.

Referring to FIG. 2, a block diagram of a particular embodiment of a synchronization module 206, corresponding to the synchronization module 106 of FIG. 1, is illustrated. The synchronization module 206 includes a pointer generation module 231, a multiplexer 204, an offset module 252, a read control module 211, a Gray Code encoder, 243, a Gray Code decoder 242, a synchronizer 212, a multiplexer 208, and a write control module 210. Each of these elements is included in a clock domain 270 that is synchronized to the clock signal CLK1.

The synchronization module 206 also includes a pointer generation module 230, a multiplexer 218, a write control module 215, a multiplexer 232, a Gray Code decoder 240, a Gray Code encoder 241, a synchronizer 214, an offset module 250, and a read control module 213. Each of these elements is included in a clock domain 275 that is synchronized to the clock signal CLK2.

In addition, the synchronization module 206 includes a FIFO memory 220 and a FIFO memory 222. As illustrated, the FIFO memories 220 and 222 are included in both clock domain 270 and clock domain 275 to indicate that the logic elements of the FIFO memories 220 and 222 can be selectively synchronized with the clock signals CLK1 and CLK2. The FIFO 220 stores data provided by the clock domain 275 and is read by the clock domain 270. The FIFO 222 stores data provided by the clock domain 270 and is read by the clock domain 275.

The pointer generation module 231 includes an output configured to provide a pointer labeled PTR_A. The multiplexer 204 includes a first input to receive the pointer PTR_A, a second input, a control input to receive the signal CLK_INFO, and an output. The offset module 252 includes an input coupled to the output of the multiplexer 204 and an output. The read control module 211 includes an input coupled the output of the offset module 252, an input coupled to an output of the FIFO 220, and an output to provide data to the module 102 (FIG. 1). The synchronizer 212 includes an input and an output. The Gray Code encoder 241 includes an input to receive a pointer labeled PTR_B and an output coupled to the input of the synchronizer 212. The Gray Code decoder 242 includes an input coupled to the output of the synchronizer 212 and an output coupled to the second input of the multiplexer 204. The multiplexer 208 includes an input to receive the pointer PTR_A, an input connected to the output of the Gray Code decoder 242, a control input to receive the signal CLK_INFO, and an output. The write control module 210 includes an input to receive data from the module 102, an input coupled to the output of the multiplexer 208, and an output coupled to the FIFO 222.

The pointer generation module 230 includes an output configured to provide a pointer labeled PTR_B. The multiplexer 232 includes a first input to receive the pointer PTR_A, a second input, a control input to receive the signal CLK_INFO, and an output. The offset module 250 includes an input coupled to the output of the multiplexer 204 and an output. The read control module 213 includes an input coupled to the output of the multiplexer 232, an input coupled to the FIFO 222, and an output to provide data to the module 104 (FIG. 1). The synchronizer 214 includes an input and an output. The Gray Code encoder 243 includes an input to receive a pointer labeled PTR_A, and an output connected to the input of the synchronizer 214. The Gray Code decoder 240 includes an input coupled to the output of the synchronizer 214 and an output coupled to the second input of the multiplexer 232. The multiplexer 218 includes an input to receive the pointer PTR_B, an input coupled to the output of the Gray Code decoder 240, a control input to receive the signal CLK_INFO, and an output. The write control module 215 includes an input to receive data from the module 102 (FIG. 1), an input coupled to the output of the multiplexer 218, and an output coupled to the FIFO 220.

With respect to the clock domain 270, the pointer generation module 231 is configured to generate the pointer PTR_A corresponding to a location of the FIFO 220 and the FIFO 222 where data is read and written respectively. The Gray Code encoder 243 is configured to encode the pointer PTR_A to a Gray Code format to make transfer of the pointer PTR_A more reliable.

The synchronizer 212 is configured to receive the Gray-Code encoded pointer PTR_B from the clock domain 275 and synchronize it so that the encoded pointer PTR_B is available to modules of the clock domain 270. In a particular embodiment, the synchronizer 212 is a number of flip-flops connected in series, with each flip-flop synchronized to the clock signal CLK1. This series of flip-flops reduces the likelihood of meta-stability at the output so that the likelihood the pointer will be transferred properly is set to an acceptable level. Although the output of the synchronizer 212 is unlikely to become metastable, the first flop in this series is very likely to become metastable creating a full cycle (in the clock domain 275) of uncertainty as to the arrival time of PTR_B into the clock domain 270 domains. However, when the pointer is provided by the slower clock domain this uncertainty is reduced, allowing for more efficient transfer of data between the clock domains.

The Gray Code decoder 242 is configured to decode the Gray Code encoded pointer PTR_B received from the clock domain 275. The multiplexers 204 and 208 are each configured to select the pointer PTR_A or the pointer PTR_B to be provided at their respective outputs based on the information provided by the signal CLK_INFO. The offset module 252 is configured to offset the selected pointer by shifting it in time to move the read pointer closer to the write pointer in time, reducing latency. This shift is typically done when the FIFO memories 220 and 222 contain no valid data, such as during initialization of the synchronization module 206.

The write control module 210 is configured to write data provided by the module 102 to the FIFO 222 based on pointer information received from the multiplexer 208. The read control module 211 is configured to read data from the FIFO 220 based on pointer information provided by the offset module 252, and to provide the read data to the module 102. In a particular embodiment, the same pointers are used to read and write to both the FIFO 220 and the FIFO 222. In an alternative embodiment, different pointers are generated for the FIFO 220 and the FIFO 222.

The elements of clock domain 275 are configured similarly with the corresponding elements of clock domain 270 so that data is provided to and from the module 104, and so that the pointer PTR_A is received from the clock domain 270. For example, the synchronizer 214 is configured similarly to the synchronizer 212 so that the pointer PTR_A can be transferred from the clock domain 270 to the clock domain 275.

During operation, the pointer generation modules 230 and 231 generate the pointers PTR_A and PTR_B, respectively. The pointers are provided to the multiplexers 205, 208, 218, and 232, which select the pointers based on the signal CLK_INFO so that the pointers generated at the clock domain associated with the slower clock frequency are provided at the outputs of the multiplexers. For example, assuming that the signal CLK_INFO indicates that CLK1 has a slower clock frequency than CLK2, the multiplexers 205, 208, 218, and 232 will provide the pointer PTR_A at their respective outputs.

The read control modules 211 and 213 and the write control modules 210 and 215 use the pointers provided by the multiplexers 204, 232, 208, and 218, respectively, to access the FIFO memory 220 and the FIFO memory 222. Because the multiplexers 205, 208, 218, and 232 provide the pointer generated at the clock domain associated with the slower clock frequency, that pointer will be used to access the FIFO memory 220 and the FIFO memory 222. Because the pointer associated with the slow domain can be synchronized more quickly at the faster domain, the latency of data transfers between the clock domain 270 and the clock domain 275 is reduced.

In a particular embodiment, the synchronization module 206 operates in a "free-running" fashion, so that data is written to and read from the FIFO memories 220 and 222 even when the module 102 or the module 104 have not provided data to be written. Accordingly, if the write control modules 210 and 215 receive a pointer but do not receive data from the module 102 or the module 104, respectively, they will indicate that the location in the FIFO associated with the pointer contains invalid data by setting a flag associated with the location in the FIFO memory. When the read control module 211 or the read control module 213 reads data from a location, it will determine whether information read from the location is valid data based on the flag associated with the location. If valid data is not detected, the read control module 211 does not provide the data to the module 102. By operating the synchronization module in a free-running fashion, the generation of pointers at the pointer generation modules 230 and 231 does not have to be timed according to when valid data to be transferred is received, thereby simplifying the implementation of the synchronization module 206.

Figure 3:
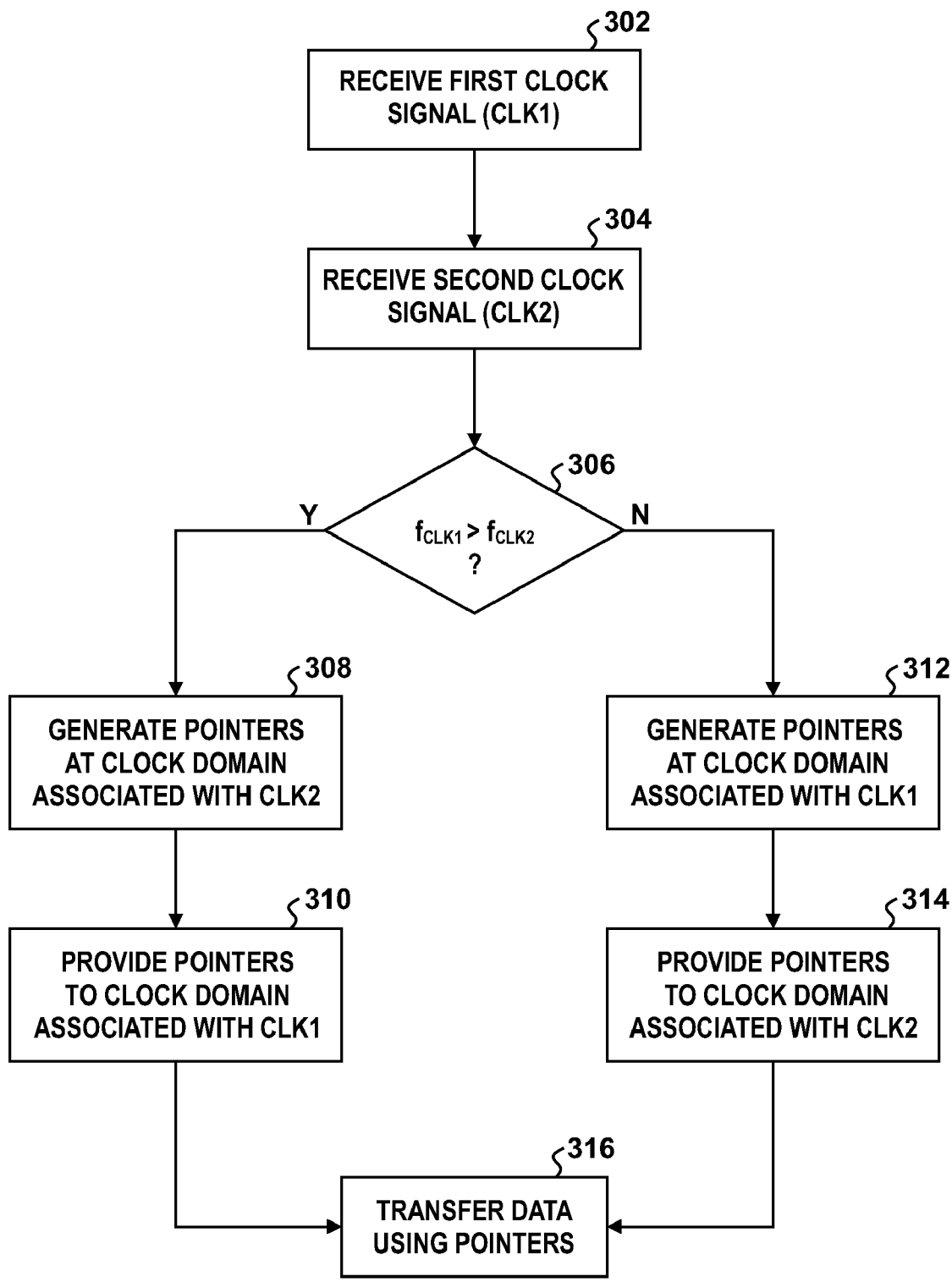
FIG. 3 is a flow diagram of a particular embodiment of a method of transferring data between different clock domains.

Referring to FIG. 3, a flow diagram of a particular embodiment of a method of transferring data between two clock domains is illustrated. At block 302, a first clock signal, labeled CLK1, is received. The clock signal CLK1 is associated with a first clock domain of a device, and is used to synchronize logic elements in that clock domain. At block 304, a second clock signal, labeled CLK2, is received. The clock signal CLK2 is associated with a second clock domain of the device and is used to synchronize logic elements in that clock domain At block 306, it is determined whether the frequency of the clock signal CLK1 is greater than the frequency of the clock signal CLK2. If so, the method flow moves to block 308 and pointers to a FIFO memory that are generated in the clock domain associated with the clock signal CLK2 are used. At block 310 the pointers generated at the CLK2 clock domain are transferred and synchronized to the time domain associated with the clock signal CLK1. Moving to block 316, the generated pointers are used to transfer the data by writing and reading to locations in the FIFO memory indicated by the pointers.

If, at block 306, it is determined that the frequency of the clock signal CLK1 is less than the frequency of the clock signal CLK2, the method flow moves to block 312 and the pointers that are generated at the clock domain associated with the clock signal CLK1 are used. At block 314 the pointers at the CLK1 clock domain are transferred and synchronized to the time domain associated with the clock signal CLK2. At block 318, the generated pointers are used to transfer data by writing and reading to locations in the FIFO memory indicated by the pointers. Accordingly, the pointers are generated at the clock domain associated with the lower-frequency clock signal. This reduces the latency in transferring the pointers between time domains, increasing the efficiency of the data transfer.

Figure 4:
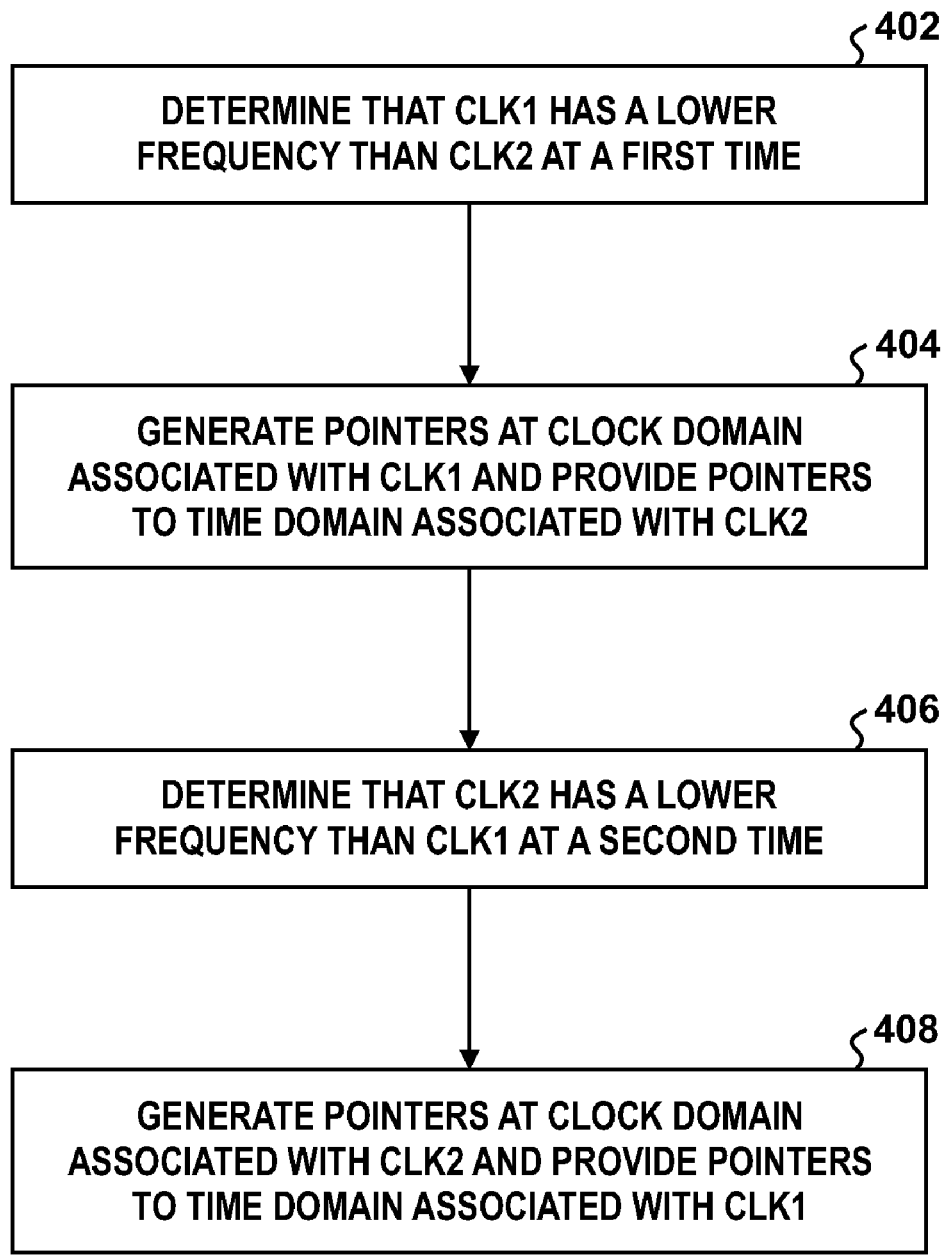
FIG. 4 is a flow diagram of another particular embodiment of a method of transferring data between different clock domains.

Referring to FIG. 4, a flow diagram of a particular embodiment of a method of transferring data between clock domains is illustrated. At block 402, it is determined at a first time that a clock signal CLK1 associated with a first clock domain of a device has a lower frequency than a clock signal CLK2 associated with a second clock domain of the device. At block 404, pointers to locations of a FIFO memory are generated at the clock domain associated with CLK1, and transferred to the clock domain associated with CLK2. The pointers are used to write and read from the FIFO memory in order to transfer data between the clock domains.

At block 406, it is determined at a second time that the clock signal CLK2 has a lower frequency than the clock signal CLK1. The change in the relative clock frequency of the clock signals can result from a number of factors. For example, the devices or device modules in the clock domain associated with the clock signal CLK1 can enter a low-power mode, causing a reduction in the clock frequency. In another embodiment, the synchronizer 206 is connected to an input/output device, and the clock speed can change based upon the input/output protocol.

At block 408, pointers to locations of the FIFO memory are generated at the clock domain associated with CLK2, and transferred to the clock domain associated with CLK1. The pointers are used to write and read from the FIFO memory to transfer data between the clock domains. Accordingly, with the illustrated method pointers are generated at the clock domain associated with the slower clock signal and provided to the clock domain associated with the faster clock signal, even after a change in the relative frequencies of the clock signals. This ensures that the latency resulting from the transfer of the pointers between clock domains is reduced, improving efficiency of data transfers.

Figure 5:
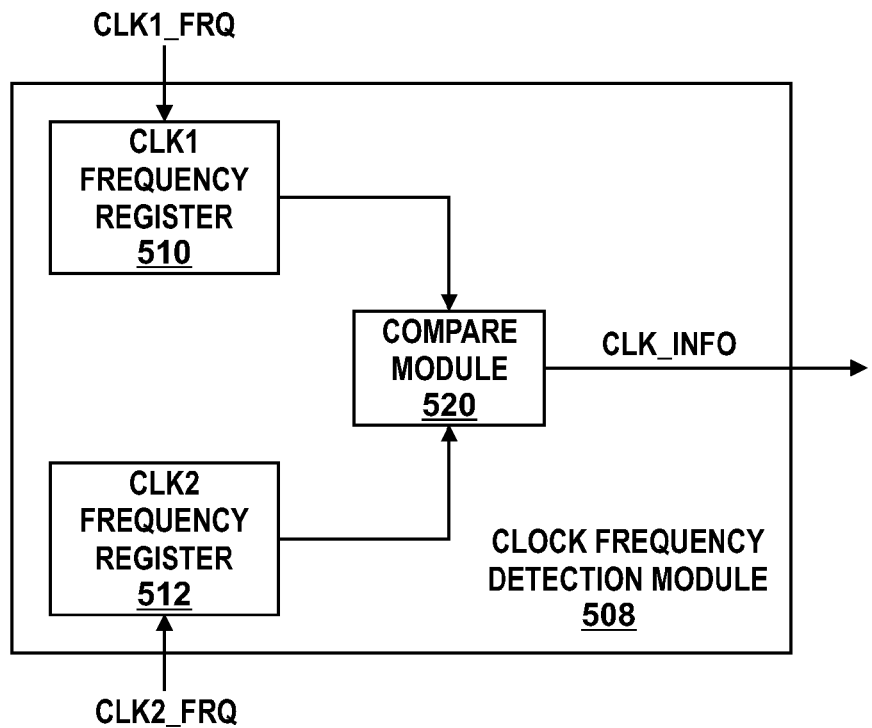
FIG. 5 is a block diagram of a particular embodiment of a clock frequency detection module of FIG. 1.

Referring to FIG. 5, a block diagram of a particular embodiment of a clock frequency detection module 508, corresponding to the clock frequency detection module 108 of FIG. 1, is illustrated. The clock frequency detection module 508 includes a register 510, a register 512, and a compare module 520. The register 510 includes an input to receive the signal CLK1_FRQ and an output. The register 512 includes an input to receive the signal CLK2_FRQ and an output. The compare module 520 includes an input connected to the output of the register 510, an input connected to the output of the register 512, and an output to provide the signal CLK_INFO.

During operation, the register 510 receives and stores information provided by the signal CLK1_FRQ indicating the frequency of the clock signal CLK1. Similarly, the register 510 receives and stores information provided by the signal CLK2_FRQ indicating the frequency of the clock signal CLK2. The compare module 520 compares the values stored in the register 510 and the register 512 and based on the comparison provides information via the CLK_INFO signal indicating which of the clock signals CLK1 and CLK2 has the higher frequency.

Figure 6:
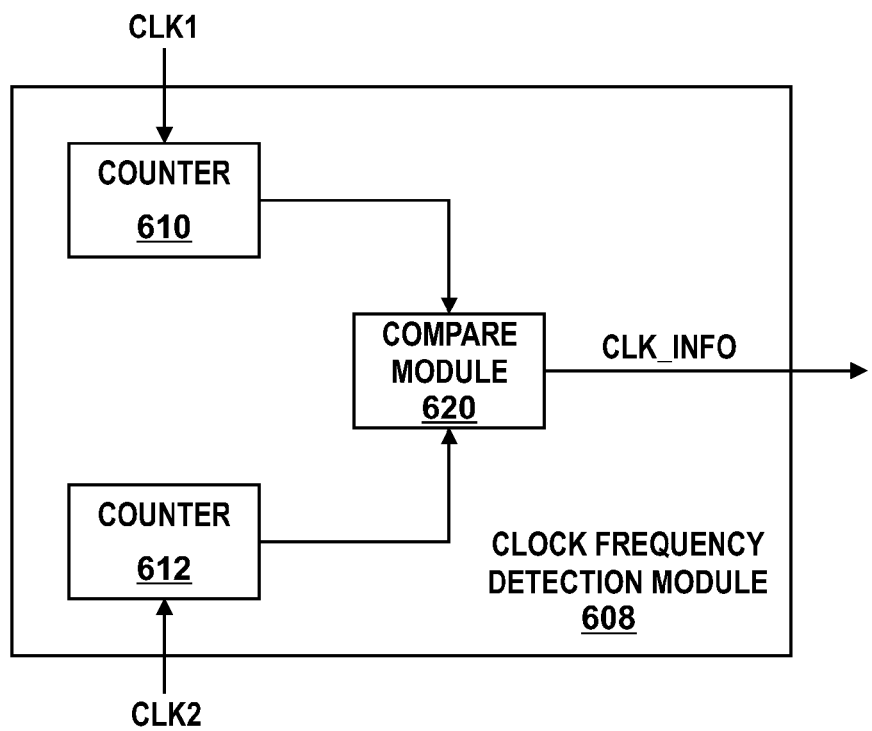
FIG. 6 is a block diagram of an alternative embodiment of the clock frequency detection module of FIG. 1.

Referring to FIG. 6, a block diagram of an alternative embodiment of a clock frequency detection module 608, corresponding to the clock frequency detection module 108 of FIG. 1, is illustrated. The clock frequency detection module 608 includes a counter 610, a counter 612, and a compare module 620. The counter 610 includes an input to receive the signal CLK1 and an output. The counter 612 includes an input to receive the signal CLK2 and an output. The compare module 620 includes an input connected to the output of the counter 610, an input connected to the output of the counter 612, and an output to provide the signal CLK_INFO.

During operation, the counter 610 stores a value that is periodically adjusted (e.g. incremented) based on the clock signal CLK1. The counter 612 stores a value that is periodically adjusted based on the clock signal CLK2. Accordingly, the relative frequencies of the clock signals CLK1 and CLK2 are indicated by the relative values stored in the counter 610 and the counter 612 respectively. For example, in a particular embodiment if the clock signal CLK1 has a higher frequency than CLK2, the value stored by the counter 610 will be higher than the value stored by the counter 612. The compare module 620 compares the values stored in the counter 610 and the counter 612 and based on the comparison provides information via the CLK_INFO signal indicating which of the clock signals CLK1 and CLK2 has the higher frequency.

Other embodiments, uses, and advantages of the disclosure will be apparent to those skilled in the art from consideration of the specification and practice of the disclosure disclosed herein. For example, it will be appreciated that although the use of a FIFO memory for data transfers has been discussed, other memories could be used to transfer data. It will further be appreciated that, although some circuit elements and modules are depicted and described as connected to other circuit elements, the illustrated elements may also be coupled via additional circuit elements, such as resistors, capacitors, transistors, and the like. The specification and drawings should be considered exemplary only, and the scope of the disclosure is accordingly intended to be limited only by the following claims and equivalents thereof.

What is claimed is:

1. A method, comprising
receiving a first clock signal at a first synchronous logic module of a device;
receiving a second clock signal at a second synchronous logic module of the device, the second clock signal asynchronous with the first clock signal;
determining that a frequency of the second clock signal is greater than a frequency of the first clock signal; and
providing a first pointer from the first synchronous logic module to the second synchronous logic module in response to determining that the frequency of the second clock signal is greater than the frequency of the first clock signal, the first pointer associated with a first location of a first FIFO memory.

2. The method of claim 1, further comprising writing data to the first location of the first FIFO memory at the first synchronous logic module.

3. The method of claim 2, further comprising reading data from the first location of the first FIFO memory at the second synchronous logic module.

4. The method of claim 1, further comprising writing data to the first location of the first FIFO memory at the second synchronous logic module in response to receiving the first pointer at the second synchronous logic module.

5. The method of claim 4, further comprising reading data from the first location of the first FIFO memory at the first synchronous logic module.

6. The method of claim 1, further comprising:
reading data from the first location of the first FIFO memory at the second synchronous logic module in response to receiving the first pointer at the second synchronous logic module; and
writing data to a first location of a second FIFO memory at the second synchronous logic module in response to receiving the first pointer at the second synchronous logic module.

7. The method of claim 1, wherein determining that the frequency of the second clock signal is greater than the frequency of the first clock signal comprises determining the frequency of the second clock signal at a first time is greater than the frequency of the first clock signal at the first time, and further comprising:

determining that a frequency of the first clock signal at a second time is greater than the frequency of the first clock signal at the second time; and providing a second pointer from the second synchronous logic module to the first synchronous logic module in response to determining that the frequency of the first clock signal at the second time is greater than the frequency of the first clock signal at the second time.

8. The method of claim 7, wherein the second pointer is associated with the first location of the first FIFO memory.

9. The method of claim 1, wherein the first pointer is a Gray code value.

10. The method of claim 1, wherein providing the first pointer comprises providing the pointer to a synchronizer, the synchronizer synchronized to the second clock signal.

11. A method, comprising:
determining at a first time that a first clock signal associated with a first clock domain of
  a device has a lower frequency than a second clock signal associated with a second clock domain of the device;
  providing a first pointer from the first clock domain to the second clock domain in response to determining at the first time that the first clock signal has a lower frequency than the second clock signal;
  writing data at the first clock domain to a first location of a FIFO memory, the first location associated with the first pointer; and reading the data at the second clock domain from the first location of the FIFO memory in response to receiving the first pointer at the second clock domain.

12. The method of claim 11, further comprising:
determining at a second time that the first clock signal has a higher frequency that the second clock signal;
providing a second pointer from the second clock domain to first clock domain in response to determining at the second time that the first clock signal has a higher frequency that the second clock signal.

13. The method of claim 12, further comprising:
writing data at the second clock domain to a first location of a FIFO memory in response to receiving the first pointer at the second clock domain, the first location associated with the first pointer; and
reading the data at the first clock domain from the first location of the FIFO memory.

14. A device, comprising:
a first pointer generation module comprising an output configured to provide a first pointer;
a first multiplexer, comprising:
  a first input coupled to the output of the first pointer generation module;
  a second input configured to receive a second pointer;
  a control input configured to receive an indication that a first clock signal has a greater frequency than a second clock signal, the first clock signal asynchronous with the second clock signal; and
  an output configured to selectively apply data at the first input or data at the second input depending on the state of a signal at the control input; and
a first memory access module comprising an input coupled to the output of the first multiplexer and an output configured to access a first queue based on a pointer received at the input.

15. The device of claim 14, further comprising:
a second multiplexer, comprising:
  a first input coupled to the output of the first pointer generation module;
  a second input configured to receive a second pointer;
  a control input configured to receive a first indication that a first clock signal has a greater frequency than a second clock signal; and
  an output configured to selectively apply data at the first input or data at the second input depending on the state of a signal at the control input; and
a second memory access module comprising an input coupled to the output of the second multiplexer and an output configured to access a second queue based on a pointer received at the input.

16. The device of claim 14, wherein the first memory access module is configured to write to the first queue and the second memory access module is configured to read from the second queue.

17. The device of claim 14, further comprising a second pointer generation module comprising an output coupled to the second input of the first multiplexer.

18. The device of claim 14, further comprising a second multiplexer, comprising:
  a first input coupled to the output of the first pointer generation module;
  a second input coupled to the output of the second pointer generation module;
  a control input configured to receive a second indication that a first clock signal has a greater frequency than a second clock signal; and
  an output configured to selectively apply data at the first input or data at the second input depending on the state of a signal at the control input.

19. The device of claim 14, further comprising a second memory access module comprising an input coupled to the output of the second multiplexer and an output configured to access the first queue based on a pointer received at the input.

20. The device of claim 15, wherein the first memory access module is configured to write to the first queue and the second memory module is configured to read from the second queue.

* * * * *